United States Patent
Qureshi et al.

(10) Patent No.: US 7,240,287 B2
(45) Date of Patent: Jul. 3, 2007

(54) SYSTEM AND METHOD FOR VIEWING AND CONTROLLING A PRESENTATION

(75) Inventors: Imran Iqbal Qureshi, Sunnyvale, CA (US); Mark Lauden Crosley, San Francisco, CA (US); Esther Chang-Yuan Ho, Cupertino, CA (US)

(73) Assignee: Microsoft Corp., Redmond, WA (US)

(*) Notice: Subject to any disclaimer, the term of this patent is extended or adjusted under 35 U.S.C. 154(b) by 594 days.

(21) Appl. No.: 09/792,758

(22) Filed: Feb. 24, 2001

(65) Prior Publication Data

US 2002/0140724 A1 Oct. 3, 2002

(51) Int. Cl.
*G06F 3/00* (2006.01)
(52) U.S. Cl. .............. 715/730; 715/732; 715/751; 345/2.2; 345/3.3
(58) Field of Classification Search ........... 345/730, 345/704, 716, 717, 732, 731, 740, 761, 765, 345/1.1, 2.1, 2.2, 3.1, 751, 733, 750, 753; 715/501.1, 500.1, 512, 513, 515
See application file for complete search history.

(56) References Cited

U.S. PATENT DOCUMENTS 5,307,055 A * 4/1994 Baskin et al. ............ 345/2.2
5,539,658 A * 7/1996 McCullough ............. 345/730
5,634,018 A * 5/1997 Tanikoshi et al. ........... 345/751
6,008,807 A * 12/1999 Bretschneider et al. .... 345/732
6,091,408 A * 7/2000 Treibitz et al. ............. 345/753
6,249,281 B1 * 6/2001 Chen et al. ................. 345/753
6,397,036 B1 * 5/2002 Thean et al. ........... 345/716 X
6,590,586 B1 * 7/2003 Swenton-Wall et al. .... 715/730
6,717,591 B1 * 4/2004 Fiveash et al. ............. 345/732
2002/0085030 A1 * 7/2002 Ghani ....................... 345/751

* cited by examiner

Primary Examiner—Raymond J. Bayerl
(74) Attorney, Agent, or Firm—Lyon & Harr, LLP; Katrina A. Lyon

(57) ABSTRACT

A system and method for delivering a presentation electronically. The invention takes advantage of the multiple monitor capabilities of a computer operating system to display a "control panel" on the computer monitor or laptop screen that typically only the presenter will view. The presenter can use this control panel to view and control the presentation while the audience only sees a full screen slideshow. Providing this "presenter" view and control makes computer-based presenting much easier. The presenter can control the specific aspects of the slideshow from the private monitor using control buttons or keyboard shortcuts.

18 Claims, 5 Drawing Sheets

SYSTEM AND METHOD FOR VIEWING AND CONTROLLING A PRESENTATION

BACKGROUND OF INVENTION

1. Technical Field

The invention is related to a system and method of customizing a software program, in this case a presentation program, to allow a presenter to control the presentation and view the presented material in ways the audience does not by employing two displays.

2. Background Art

By way of background, an electronic presentation is typically made up of several electronic "slides" that are similar to the slides presented in a non-electronic presentation. For example, these electronic slides employ the use of bullets or text paragraphs and graphics such as charts. However, electronic presentations also have a multitude of other features such as animation, graphical effects and automatic presentation timing that enhance the presentation experience for both the presenter and the audience.

Another aspect of presenting is the use of speaker's notes. Speakers sometimes use these speaker's notes in conjunction with their presentation of the slides in either an electronic or non-electronic presentation to be reminded of additional information that they wish to be reminded of while speaking, but do not wish to put on the slide itself. Since the notes are typically written on paper, as the speaker presents, he often has to shuffle the papers looking for the notes for the current slide. This looks unprofessional and leaves a bad impression with the audience. Many presenters do not use speaker notes at all for this reason.

When presenters deliver computer-based presentations using a projector, they must typically either watch the presentation on the same screen that the audience views, or they must view the presentation on a computer monitor or laptop screen. In each of these situations, the presenters view the same presentation as the audience, and are unable to use their computer to control the flow of the show. Some presentation software allows the presenter to view the presentation editing screen to edit the presentation while the audience sees it, but the presenter cannot control the flow of the presentation during this editing process.

Presenting to a large audience can be a difficult task. While speaking, the presenter must view and control an on-screen presentation while simultaneously focusing attention on the audience. Many presenters find that these demands and limitations inhibit their ability to narrate their presentation effectively.

Among presenters' complaints with electronic presentation software is the inability to determine what the next bullet or graphic on a slide is if it has not yet been rendered on the display. As a result, the presenter must speak about a bullet, then stop and forward to the next bullet by using some selection device. When the next bullet appears, the presenter reads it, remembers what he or she wanted to say and then speaks. This results in a non-fluent presentation. Another complaint of presenters is that they do not typically know when they have reached the end of the slide. The presenter may not remember that all the bullets on a particular slide have been addressed. The presenter then elects to advance to the next slide when they still wanted to talk about the previous slide. Many presenters do not know how to go forward and backward back in a slideshow. Therefore, they sometimes exit the slideshow and restart it, navigating forward through the presentation until the desired slide is presented.

Another drawback of current presentation software is that presenters are forced to present in the same sequence of slides and cannot customize their presentation to the audience. For example, if the audience looks bored when accounting slides are being presented, the presenter may want to skip over these slides to slides that are of more interest to the audience. Additionally, sometimes a question comes up that is relevant to a slide that the presenter had shown previously, but the presenter often has difficulty returning to, or advancing to, that slide. In order to jump to another slide, the presenter must remember the slide number and enter it on the keyboard or otherwise select the slide number.

Most presenters are given a certain amount of time to present. To keep on schedule, the presenters have to keep looking at their watch, which looks unprofessional. They also have to calculate from the time of day to how long their presentation has gone, in order to determine how much time remains for them to present the material in the presentation.

SUMMARY OF INVENTION

The system and method according to the present invention seeks to solve the aforementioned problems by providing a new way to deliver presentations electronically. The system and method according to the present invention takes advantage of the multiple monitor capabilities of a computer operating system to display a "presentation control panel" or presenter's view on a computer monitor or laptop screen viewed and controlled by the presenter, while displaying a different view of the same presentation on at least one other monitor. The presenter can use this "presenter's view" control panel to view the presentation in ways that the audience cannot, and to control the sequence and other display parameters of the presentation. Providing this presenter's view and control make computer-based presenting much easier by enabling a presenter to present using at least two displays or monitors, one display with controls and viewing panes that the presenter alone can see, and a second display that the audience sees. Consequently, the presenter can control the specific aspects of the slide show from the private monitor or display.

Typically the presenter controls the flow of the presentation or slide show from the presenter's view via a graphical user interface having control buttons or keyboard shortcuts. The buttons used to control the flow of the presentation are preferably quite large so that they are easy for the presenter to use when they are involved in presenting their material.

In general, the system and method according to the present invention extracts raw information including slides, speaker notes, timing, etc. from a presentation or other electronic files; processes this raw information; and allows for process control and display of the presentation using this processed information. The invention then customizes the view of the presentation for the presenter and provides single selection action or single-click access to allow for effective control of the presentation flow. The user interface of the present invention allows access to more than one information source and combines the data from these multiple sources into one easily accessible location. It provides a unique view of the information from a variety of sources, improving access for the presenter to this information by integrating it onto one display. The present invention also allows for improved interactivity with the information, hence providing better presentation flow and control. It also displays the speaker notes on the presenter's display so that the presenter can see them but the audience cannot.

The system and process according to the present invention uses the program modules to automatically and dynamically display presentation data objects and other data extracted from an electronic presentation file or other electronic data sources or files by using a presentation display module to dynamically display the data and control buttons on a first conventional display device. This data may include, for example, slides, timing information, animations, bullets, charts, speaker's notes and the like. A second display device is typically used to present the presentation as normally viewed by the audience (only the actual slides or presentation material is displayed), while the user of the present invention uses the data display panes and control buttons of the first display device to view and control the presentation. The presentation data objects are preferably automatically retrieved from one or more electronic presentations or electronic data sources or files using conventional techniques. The control buttons allow the user to navigate through the presentation and control what is displayed on the presentation display module and the display device. The system and method according to the present invention preferably employs the use of a computer that supports multiple monitors or displays. This includes desktop computers with two video cards or laptops with dual-view chips. Preferably one or more of the following display panes and control buttons is displayed to the presenter.

1. "Slide Show Image" Display Pane: A Slideshow Image display pane shows exactly what the audience is seeing. This will typically be a full-screen slide of presented information. The presenter can advance to the next slide or bullet by clicking in this area just as they advance in a normal slideshow or electronic presentation. The presenter typically may navigate through the slides by using keyboard buttons such as page up and page down, or may scroll up and down by using a mouse or other pointing device.

2. "Next" Control Button: The presenter can advance to the next bullet, animation or slide by selecting a Next control button. This button shows the audience (and the presenter) the next bullet, animation or slide, whatever is next in the presentation.

3. "Up Next" Display Pane: An Up Next display pane of the presenter's view display shows the text of the next bullet that will show when the presenter takes action to advance in the presentation. If the next click will advance to the next slide then this area shows "[Slide x]" followed by the title of the slide. If the next selection action will display a bullet of information then the text of this bullet is displayed in this display pane.

4. "Speaker Notes" Display Pane: A Speakers Notes display pane shows the speaker notes for the current slide. These notes are typically entered into the presentation software by a user typing in the information via a computer keyboard. Other methods of input could be used, however, such as scanning handwritten notes. As the presenter advances slides, this area automatically updates to show the current slide's speaker notes.

5. "Undo" Control Button: Selecting an Undo control button (or "Previous" control button, since its companion button is called the Next control button) allows the presenter to undo their last advancing action or click. For example, if a slide advances when a user accidentally clicks, they can select this Undo control button and go back to the previous slide. Or the user can go back to the last previous bullet or animation by selecting this button, if these events occurred just before the advancing action or click.

6. "Thumbnails" Display Pane: A Thumbnails display pane shows "thumbnails", or graphical representations, of all the slides in the presentation. The slide currently being presented is typically highlighted and the title of the slide is listed above its thumbnail representation. If the user hovers over such a thumbnail with a computer input device such as a mouse cursor, another display pane (typically referred to as a tool tip) appears with the full title of the slide. The user may select and click on any of these thumbnails to provide the audience with the slide corresponding to the thumbnail representation.

7. "Slide Number" Display Pane: A Slide Number display pane shows where the presenter is in the presentation in terms of slides. The Slide Number display pane reveals how many slides are left in the presentation, so that the presenter can time his presentation accordingly.

8. "Time" Display Pane: A Time display pane typically shows the time that has elapsed since the presentation started. This helps the presenter stay within the time for presenting. This information could be based on a single timer, multiple timers, or conceivably this time could be configurable by the user. The time displayed could also be remaining time or reflect slide timing.

9. "End Show" Control Button: Selecting an End Show control button ends the slideshow or presentation.

10. "Black Screen" Control Button: Selecting a Black Screen control button turns the audience screen black, or otherwise blank, so the presenter can talk about something while not having the audience distracted by other information displayed on the screen. Clicking the button again returns the slideshow or presentation to where it was before the screen was blackened or blanked.

This system and method according to the present invention solves several of the aforementioned presenter problems. The "Up Next" display pane tells the presenter what bullet, animation or slide is coming up next, thereby eliminating the problem of the presenter not knowing what is to be displayed next until it is actually shown. The "Up Next" display pane also lets the inventor know if the next click will advance the slide. (The presenter can choose not to advance the slide, by going backward in the presentation by using the "Undo" button). The "Speaker Notes" display pane shows the speaker's notes right on the presenter's view screen, thereby resolving the problem of the presenter shuffling papers to find the right information to speak to when a specific desired slide is displayed. Additionally, the "Thumbnail" views of the slides allow the presenter to preview and jump to specific slides, thereby allowing the presenter to customize their presentation to their audience. A time elapsed or other appropriate time is shown on the presenter's screen, thereby possibly circumventing the need for the presenter to calculate the time left for his or her presentation. Other times could also be displayed, such as the time left, or the time a particular slide is expected to take to present.

Other embodiments of the system and method according to the present invention include an interactive text, audio or video display pane. For instance, the presentation can be broadcast to an audience over a network such as the Internet. The presenter still exercises flow control over the presentation via the presenter's view display. However, in this embodiment the audience is provided with the capability to ask the presenter questions via email, chat or instant messaging capability, or via telephony such as voice over Internet Protocol (IP) or some form of video communications. Such communications could be one-way or two-way.

Still further embodiments of the system allow the audience to be given some control over the presentation. For instance, in one embodiment, members of the audience are given full remote control of the presentation, or a cached copy of the presentation is made available to audience members so they can navigate within the presentation without having an impact on what is viewed by other audience members. Alternately, another embodiment allows for shared control between audience members, or between audience members and the presenter.

BRIEF DESCRIPTION OF DRAWINGS

The specific features, aspects, and advantages of the present invention will become better understood with regard to the following description, appended claims and accompanying drawings where:

DETAILED DESCRIPTION

In the following description of the preferred embodiments of the present invention, reference is made to the accompanying drawings, which form a part hereof, and which is shown by way of illustration of specific embodiments in which the invention may be practiced. It is understood that other embodiments may be utilized and structural changes may be made without departing from the scope of the present invention.

Exemplary Operating Environment

Figure 1:
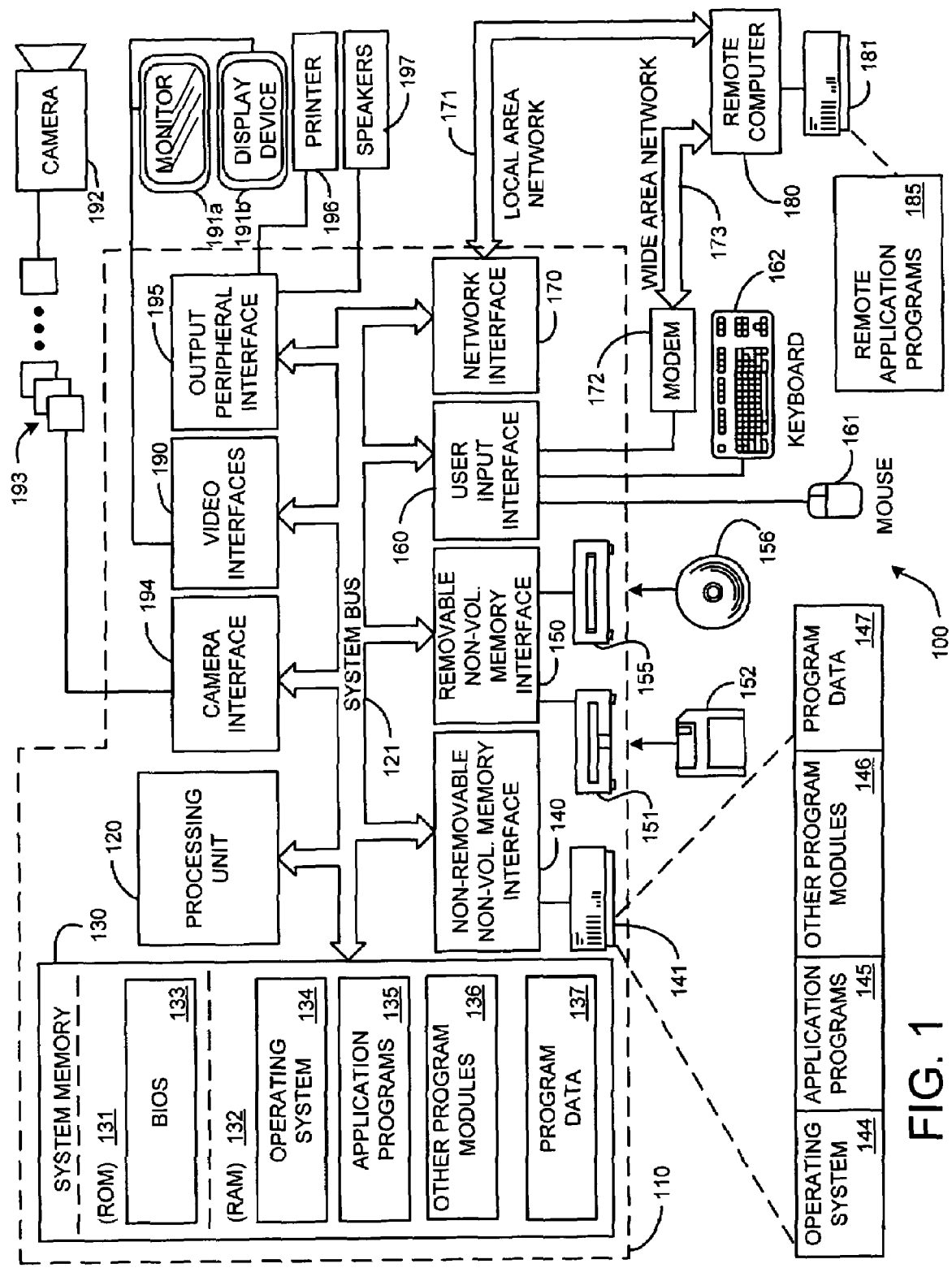
FIG. 1 is a diagram depicting a general purpose computing device constituting an exemplary system for implementing the present invention.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media. Computer storage media includes volatile and nonvolatile removable and non-removable media implemented in any method or technology for storage of information such as computer readable instructions, data structures, program modules or other data. Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). One or more monitors 191a or other type of display devices 191b are also connected to the system bus 121 via an interface, such as one or more video interfaces 190. In addition to the one or more monitors, computers may also include other peripheral output devices such as speakers 197 and printer 196, which may be connected through an output peripheral interface 195. Of particular significance to the present invention, a camera 192 (such as a digital/electronic still or video camera, or film/photographic scanner) capable of capturing a sequence of images 193 can also be included as an input device to the personal computer 110. Further, while just one camera is depicted, multiple cameras could be included as an input device to the personal computer 110. The images 193 from the one or more cameras are input into the computer 110 via an appropriate camera interface 194. This interface 194 is connected to the system bus 121, thereby allowing the images to be routed to and stored in the RAM 132, or one of the other data storage devices associated with the computer 110. However, it is noted that image data can be input into the computer 110 from any of the aforementioned computer-readable media as well, without requiring the use of the camera 192.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

The exemplary operating environment having now been discussed, the remaining parts of this description section will be devoted to a description of the program modules embodying the invention.

System Overview

The system and method according to the present invention takes advantage of the multiple monitor capabilities of a computer operating system, such as Microsoft Corporation's Windows® operating system, to display a "presentation control panel" or presenter's view on a computer monitor or laptop screen viewed and controlled by the presenter, while displaying a different view of the same presentation on at least one other monitor. The presenter can use this "presenter's view" control panel to view the presentation in ways that the audience cannot, and to control the sequence and other display parameters of the presentation. Providing this presenter's view and control make computer-based presenting much easier by enabling a presenter to present using at least two displays or monitors, one display with controls and viewing panes that the presenter alone can see, and a second display that the audience sees. In other words, the presentation or slideshow is displayed on one display, visible to the audience, while a different view, typically containing a windowed view of the slideshow plus show controls, is displayed on the presenter's private monitor. Consequently, the presenter can control the specific aspects of the slide show from the private monitor or display. Typically the presenter controls the flow of the presentation or slide show from the presenter's view via a graphical user interface having control buttons or keyboard shortcuts. Any such buttons used to control the flow of the presentation should preferably be quite large so that they are easy for the presenter to use when they are involved in presenting their material. This "Presenter View" is new in its use of at least two distinct displays to control and deliver a computer-based slide show, as well as in the use of interactive controls on the presenter's monitor.

Figure 2:
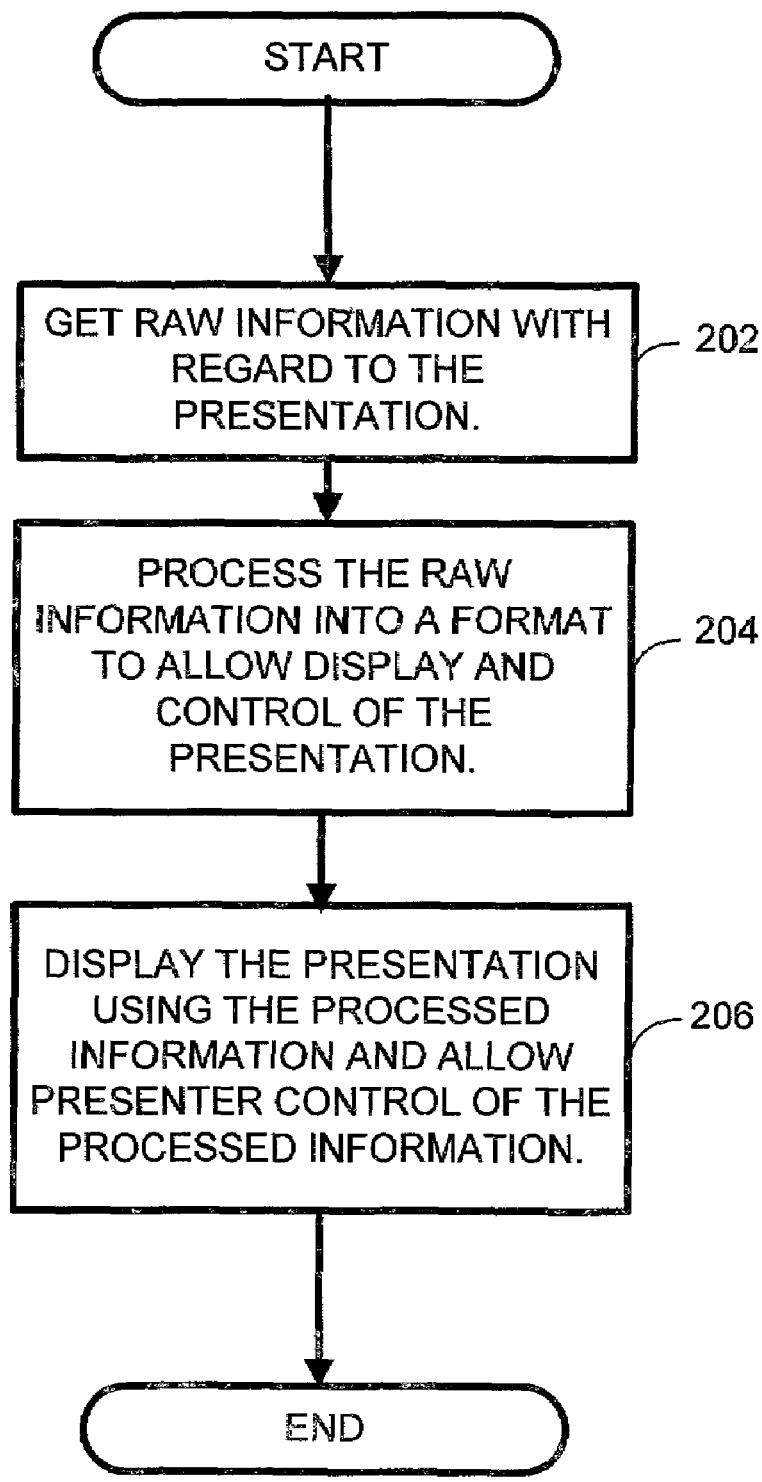
FIG. 2 is a flow diagram depicting a general overview of the system and method according to the present invention.

In general, as shown in FIG. 2, the system and method according to the present invention extracts raw information including slides, speaker notes, timing, etc. from a presentation or other electronic files (process action 202); processes this raw information (process action 204); and allows for process control and display of the presentation using this processed information (process action 206). The invention then customizes the presentation for the presenter and provides single selection action or single-click access to allow for effective control of the presentation flow. The user interface of the present invention allows access to more than one information source and combines the data from these multiple sources into one easily accessible location. It provides a unique view of the information from a variety of sources, improving access to the presenter to this information by integrating it onto one display. The present invention also allows for improved interactivity with the information, hence providing better presentation flow and control.

Figure 3:
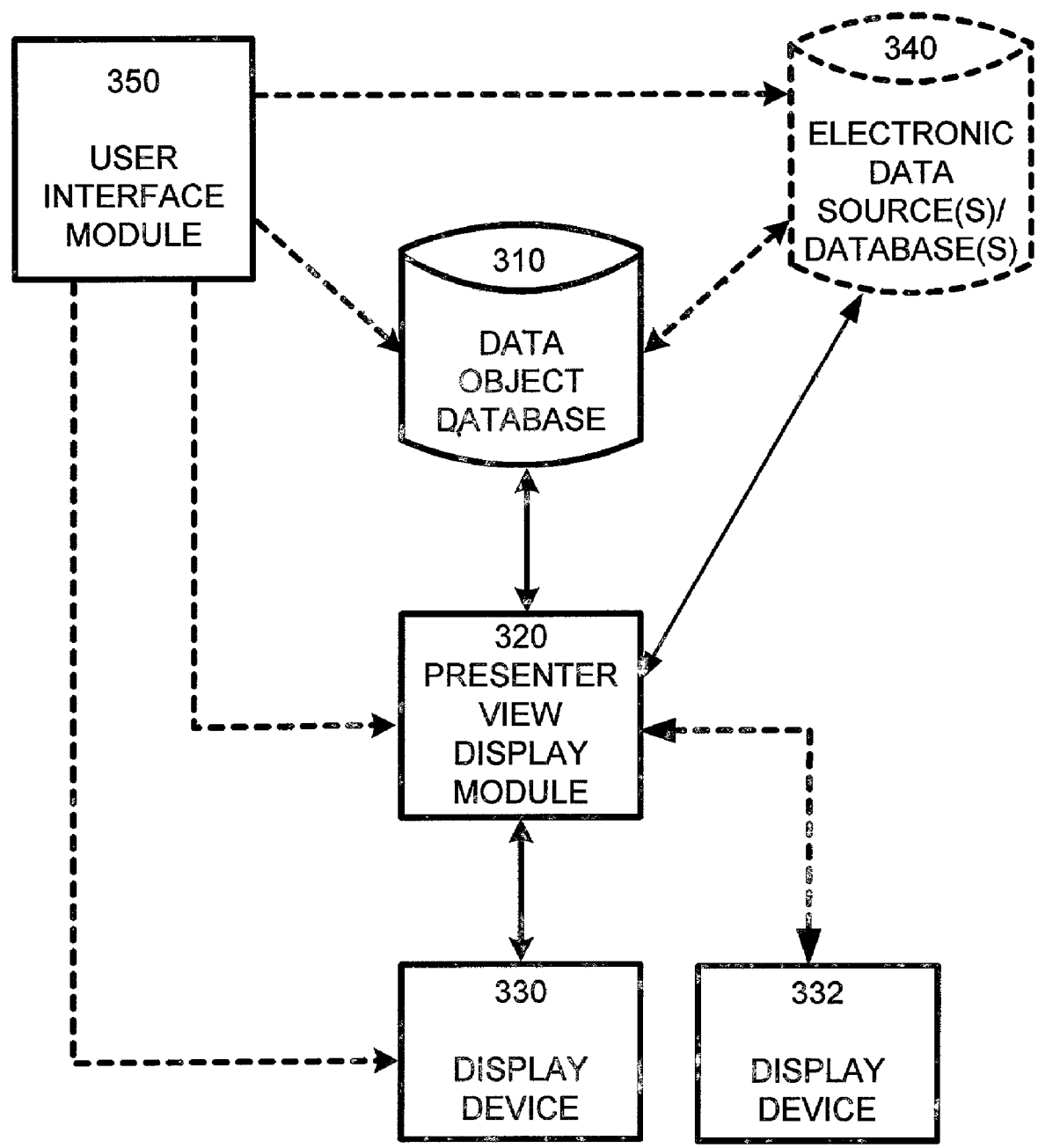
FIG. 3 is a system diagram that depicts exemplary program modules employed in a system according to the present invention.

FIG. 3 is a general system diagram illustrating program modules used for processing the raw information and allowing for process control and display of the presentation. It should be noted that the boxes and interconnections between boxes that are represented by broken or dashed lines in FIG. 3 represent alternate embodiments of the present invention, and that any or all of these alternate embodiments, as described below, may be used in combination.

In general, a system and process according to the present invention uses the program modules illustrated in FIG. 3 to automatically and dynamically display presentation data objects and other data extracted from an electronic presentation file 310 or other electronic data sources or files 340 by using a presentation display module 320 to dynamically display the data and control buttons on a first conventional display device 330. This data may include, for example, slides, timing information, animations, bullets, charts, speaker's notes and the like. A second display device 332 is typically used to present the presentation as normally viewed by the audience (only the actual slides or presentation material is displayed), while the user of the present invention uses the data display panes and control buttons of the first display device to view and control the presentation. The presentation data objects are preferably automatically retrieved from one or more electronic presentations 310 or electronic data sources or files 340 using conventional techniques. The control buttons allow the user to navigate through the presentation and control what is displayed on the presentation display module 330 and the second display device 332.

Figure 4:
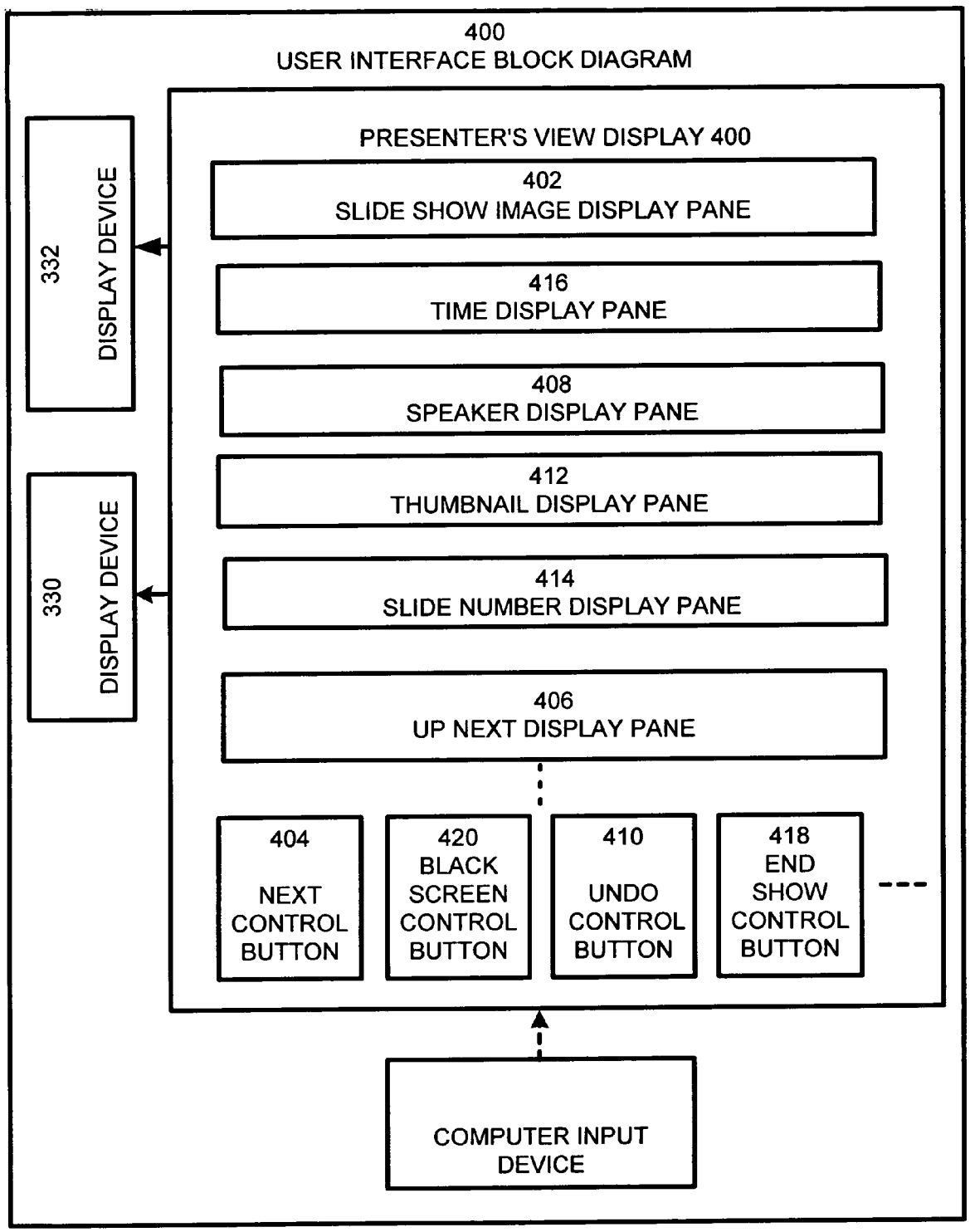
FIG. 4 is an exemplary block diagram of a user interface for interacting with the system and method according to the present invention.

Exemplary User Interface:

As discussed previously, the system and method according to the present invention preferably employs the use of a computer that supports multiple monitors or displays. Such capability is provided using conventional techniques such as desktop or laptop computers having two video cards or a single multi-head video card. With this multiple monitor feature enabled, the user launches the presentation or slide show. Then in one embodiment of the invention the presenter's view as represented by the block diagram of FIG. 4 is displayed on the presenter's screen 400, while the slide show is presented normally on at least one additional monitor. This presenter's screen 400 preferably has one or more display panes or control buttons as described in the following paragraphs.

A "Slide Show Image" display pane 402 shows what the audience is seeing. The presenter can advance to the next bullet of displayed information or the next slide by clicking in this area. The presenter navigates through the slides by using keyboard buttons such as page up and page down, or alternately by scrolling up and down by using a mouse or other computer pointing device to activate control buttons for navigating through the presentation.

A "Next" control button 404 allows the presenter to advance to the next bullet, animation or slide by selecting this control button. When using the Next control button 404, the Slide Show Image display pane 402 will show the audience (and the presenter) the next bullet, slide, or whatever is next such as an animation or an effect. This Next control button 404 is preferably large enough so that the presenter can easily select and click on the Next control button with a mouse or other computer input device while presenting.

An "Up Next" display pane 406 shows the text of the next bullet, slide, animation or other action that will be displayed when the presenter takes action to advance the presentation. Further, if the next advance of the presentation will advance to the next slide then this area shows "[Slide x]" followed by the title of the slide, where x is the slide sequence number in the presentation.

A "Speaker Notes" display pane 408 shows the speaker notes for the current slide. As the presenter advances slides, this area automatically updates to show the current slide's speaker notes. These notes are typically entered into the presentation software by a user typing them in. However, the notes could also be handwritten and scanned into an electronic file for display in the Speaker Notes display pane 408.

An "Undo" control button 410 allows the presenter to undo their last advance by clicking on or otherwise selecting this button. For example, if the slide advances when the user accidentally clicks the computer input device, they can select this Undo control button 410 and go back to the previous bullet, animation or slide, depending on whatever came before the last advancing action. The user can also click on the button several times to go back several bullets or slides in the presentation sequence.

A "Thumbnails" display pane 412 shows "thumbnails", or graphical representations, of all of the slides in the presentation. The current slide is highlighted, and in one embodiment, the title of the slide is provided above the thumbnail. Further, in another embodiment, if the user hovers the computer input device, such as a mouse cursor, over a thumbnail, another display window, commonly referred to as a "tool tip", will appear with the full title of the slide. The user may select and click on any of the thumbnails to provide the viewer with the corresponding slide in the Slideshow Image display pane 402. Thus, using this Thumbnails display pane 412, the user can easily navigate through the presentation's slides in any order.

A "Slide Number" display pane 414 shows where the presenter is in the presentation and how many slides are left so the presenter can time his presentation accordingly.

A "Time" display pane 416 preferably shows the time that has elapsed since the presentation started. This Time display pane is typically populated with information extracted from a timer running in the software. This timing information helps the presenter stay within the allotted time. Additionally, in further embodiments, information displayed in this pane is provided using either a single timer, multiple timers, or via a timer configurable by the user. For example, the time displayed could be elapsed time, remaining time, individual slide timing or any other user-configurable time scheme.

When a user selects an "End Show" control button 418, the slide show or presentation is ended.

Another feature of the present invention is a "Black Screen" control button 420 that turns the audience screen black, or otherwise hides the presentation material, so that the presenter can talk about something while not having the audience distracted by other information displayed on the screen. Selecting the Black Screen control button 420 again returns the presentation to where it was before the screen was blackened.

Other embodiments of the system and method according to the present invention include an interactive text, audio or video display pane, or a combination of these. For instance, in one embodiment, the presentation is broadcast to an audience over a network such as the Internet. The presenter again exercises flow control over the presentation via the presenter's view display. However, in this embodiment the audience is provided with the capability to ask the presenter questions via email, chat or instant messaging capability, or via telephony such as voice over Internet Protocol (IP) or some form of video communications. Such communications are either one-way or two-way.

Still further embodiments of the system allow the audience to be given some control over the presentation. For instance, in one embodiment, members of the audience are given full remote control of the presentation, or a cached copy of the presentation is made available to audience members so they can navigate within the presentation without impacting on what is viewed by other audience members.

Figure 5:
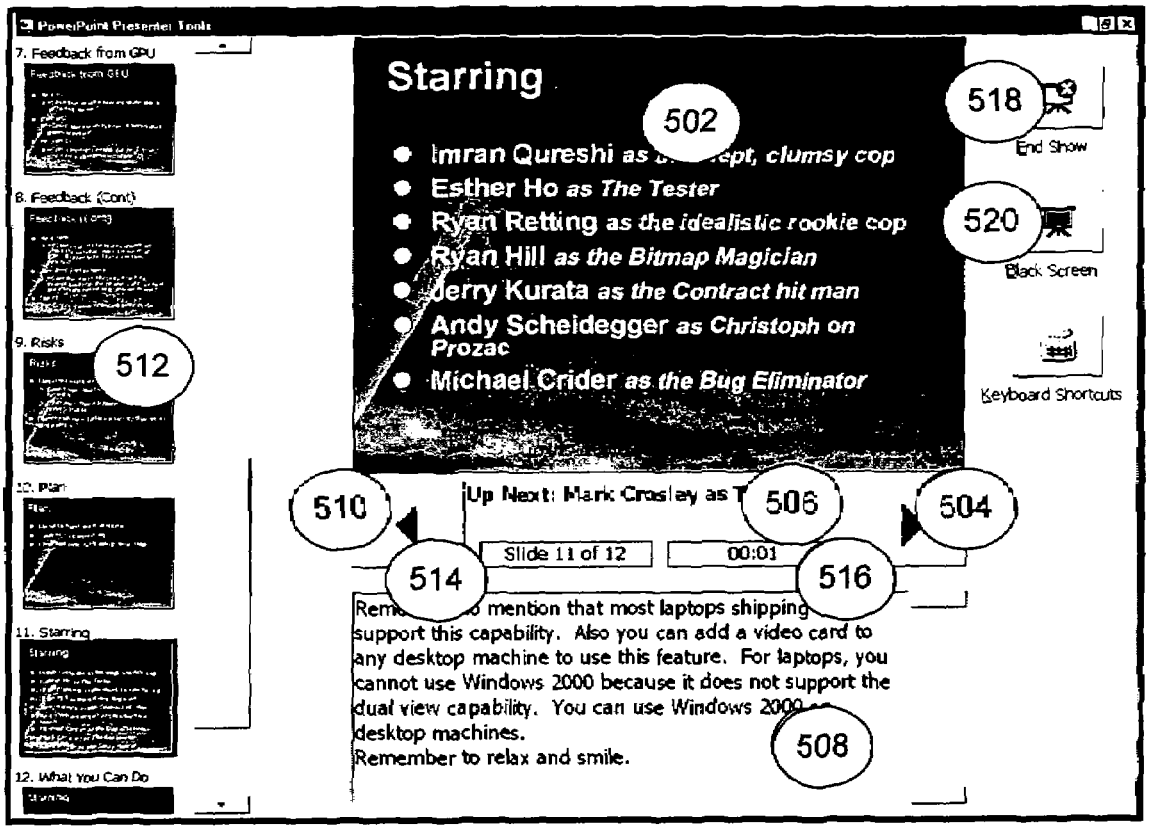
FIG. 5 is a screen image showing an exemplary implementation of a working example according to the present invention.

Working Example:

In a working example of the present invention, as illustrated by the screen image of FIG. 5, an exemplary system and method for providing a presenter's view is shown. Data display panes 502, 506, 508, 512, 514 and 516 show the Slide Show Image display pane, the Up Next display pane, the Speaker's Notes display pane, the Thumbnail display pane, the Slide Number display pane and the Time display pane, respectively. Additionally, control buttons 504, 510, 518 and 520, show the Next control button, the Undo control button, the End Show control button and the Black Screen control button, respectively.

While the invention has been described in detail by specific reference to preferred embodiments thereof, it is understood that variations and modifications thereof may be made without departing from the true spirit and scope of the invention.

The invention claimed is:

1. A computer-readable storage medium having computer executable instructions stored thereon for viewing and controlling an electronic presentation comprising content displayed on slides on a computer display device, said computer-executable instructions operable to:
   display the slides of the electronic presentation on one or more audience displays viewed by audience members;
   display the slides of the electronic presentation on a presenter display viewed by a presenter; and
   control and reorder an original sequence order of the slides of content of said electronic presentation, to include adding new slides of presentation content that was not in the original sequence order of the slides of content in real time during the delivery of the presentation in response to commands received from either audience members or the presenter.

2. A computer-implemented process for viewing and controlling an electronic presentation on a computer display device, comprising the process actions of:
   displaying the electronic presentation on one or more audience displays viewed by audience members;
   displaying the electronic presentation on a presenter display viewed by a presenter; and
   controlling and reordering a sequence order of slides of said electronic presentation, to include adding a new slide that was not in the original sequence order of the slides in real time during the delivery of the presentation in response to commands received from two or more audience members.

3. The computer-implemented process of claim 2 further comprising the process action of communicating in two directions between the first display device and second display device by at east one of:
   communicating using interactive text, communicating using audio; and
   communicating using video.

4. A system for viewing and controlling a presentation on at least two computer screens comprising:
   at least one general purpose computing device, said general purpose computing device being capable of displaying different data on different computer screens; and
   a computer program comprising program modules executable by the at least one computing device, wherein the at least one computing device is directed by the program modules of the computer program to,
     display and control an electronic presentation on a presenter display viewed and controlled by a presenter; and
     provide a cached copy of said electronic presentation to at least one audience member and allowing said at least one audience member to display and control the presentation to include reordering the original sequence of slides in the presentation at said audience member's display without affecting the presenter's display or any other audience member's display that are simultaneously viewing the same presentation and without omitting any of the slides of the original sequence.

5. The system of claim 4 further comprising a computer module to extract timing information from a timing source for displaying presentation time to a presenter.

6. The system of claim 5 wherein the timing information comprises at least one of:
   time elapsed since the electronic presentation was started;
   time remaining in the presentation;
   a user-specified time; and
   time to present a given slide of said presentation.

7. The system of claim 4 wherein at least one slide of said presentation is graphically represented.

8. The system of claim 7 wherein a pop-up window appears when a computer input device is placed above said graphically represented slide.

9. The system of claim 4 wherein the program module to display and control the flow of the presentation at the presenter display comprises a control device for adding new presentation content to the presentation.

10. The system of claim 4 further comprising a program module to broadcast said presentation over a network between said presenter display and said one or more audience displays.

11. The system of claim 10 wherein the program module to broadcast comprises a sub-module to interact via telephony.

12. The system of claim 10 wherein the program module to broadcast comprises a sub-module to interact via interactive text.

13. The system of claim 10 wherein the program module to interact comprises a sub-module to interact via video communications.

14. The system of claim 4 wherein the program module to display and control the flow of the presentation at the presenter display comprises a control device for advancing to the next presentation content in the presentation.

15. The system of claim 4 wherein the program module to display and control the flow of the presentation at the presenter display comprises a control device for blanking the presentation content from the audience.

16. The system of claim 4 wherein the program module to display and control the flow of the presentation at the presenter display comprises a control device for returning to previous presentation content.

17. The system of claim 4 wherein the program module to display and control the flow of the presentation at the presenter display comprises a control device for skipping to presentation content that is not the next presentation content in a predetermined sequence.

18. The system of claim 4 wherein the program module to display and control the flow of the presentation at the presenter display comprises a control device for ending the presentation.

* * * * *